United States Patent
Lappe et al.

(10) Patent No.: US 12,521,462 B2
(45) Date of Patent: Jan. 13, 2026

(54) AROMA DIFFUSER DEVICE

(71) Applicant: Hyku Home Inc, Austin, TX (US)

(72) Inventors: Lucas Lappe, Austin, TX (US); Justin Seidenfeld, Austin, TX (US)

(73) Assignee: Hyku Home Inc

( * ) Notice: Subject to any disclaimer, the term of this patent is extended or adjusted under 35 U.S.C. 154(b) by 586 days.

(21) Appl. No.: 17/885,532

(22) Filed: Aug. 10, 2022

(65) Prior Publication Data

US 2023/0049955 A1   Feb. 16, 2023

Related U.S. Application Data

(63) Continuation-in-part of application No. 29/803,130, filed on Aug. 10, 2021, now Pat. No. Des. 998,774.

(60) Provisional application No. 63/231,712, filed on Aug. 10, 2021.

(51) Int. Cl.
  *A61L 9/12*   (2006.01)
  *A61L 9/04*   (2006.01)
(52) U.S. Cl.
  CPC .............. *A61L 9/122* (2013.01); *A61L 9/044* (2013.01); *A61L 9/046* (2013.01)

(58) Field of Classification Search
  None
  See application file for complete search history.

(56) References Cited

U.S. PATENT DOCUMENTS

| | | | |
|---|---|---|---|
| 6,713,024 B1* | 3/2004 | Arnell | A61L 9/125 239/57 |
| 10,905,789 B2 | 2/2021 | Young et al. | |
| 2004/0009103 A1* | 1/2004 | Westring | A61L 9/04 422/125 |
| 2011/0027124 A1 | 2/2011 | Albee et al. | |
| 2020/0254851 A1* | 8/2020 | Nixon | B05B 11/06 |

OTHER PUBLICATIONS

Canopy. "Aroma Diffuser" get.canopy.co, [online] retrieved on Mar. 7, 2025. https://getcanopy.co/products/canopy-diffuser?variant=40960281903274 (Year: 2021).*

* cited by examiner

*Primary Examiner* — Jelitza M Perez
(74) *Attorney, Agent, or Firm* — Bochner PLLC; Andrew Bochner

(57) ABSTRACT

An aroma diffuser device for diffusing selected scents into the airspace of interior habitable spaces is disclosed. The disclosed device includes multiple diffusers for diffusing multiple scents into a fan-induced airstream. Two, three or more diffusers can be included in and/or upon the device.

7 Claims, 25 Drawing Sheets

AROMA DIFFUSER DEVICE

RELATED APPLICATIONS

The subject matter of this application is related to U.S. Provisional Application No. 63/231,712, filed on 2021 Aug. 10, and U.S. Design patent application Ser. No. 29/803,130, filed on 2021 Aug. 10, all of which applications are incorporated herein by reference in their entireties.

SUMMARY OF THE INVENTION

An aroma diffuser device for diffusing selected scents into the airspace of interior habitable spaces is disclosed. The disclosed device includes multiple diffusers for diffusing multiple scents into a fan-induced airstream. Two, three or more diffusers can be included in and/or upon the device.

As will be appreciated by one skilled in the art, multiple aspects described in this summary can be variously combined in different operable embodiments. All such operable combinations, though they may not be explicitly set forth in the interest of efficiency, are specifically contemplated by this disclosure.

DETAILED DESCRIPTION

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

Figure 1:
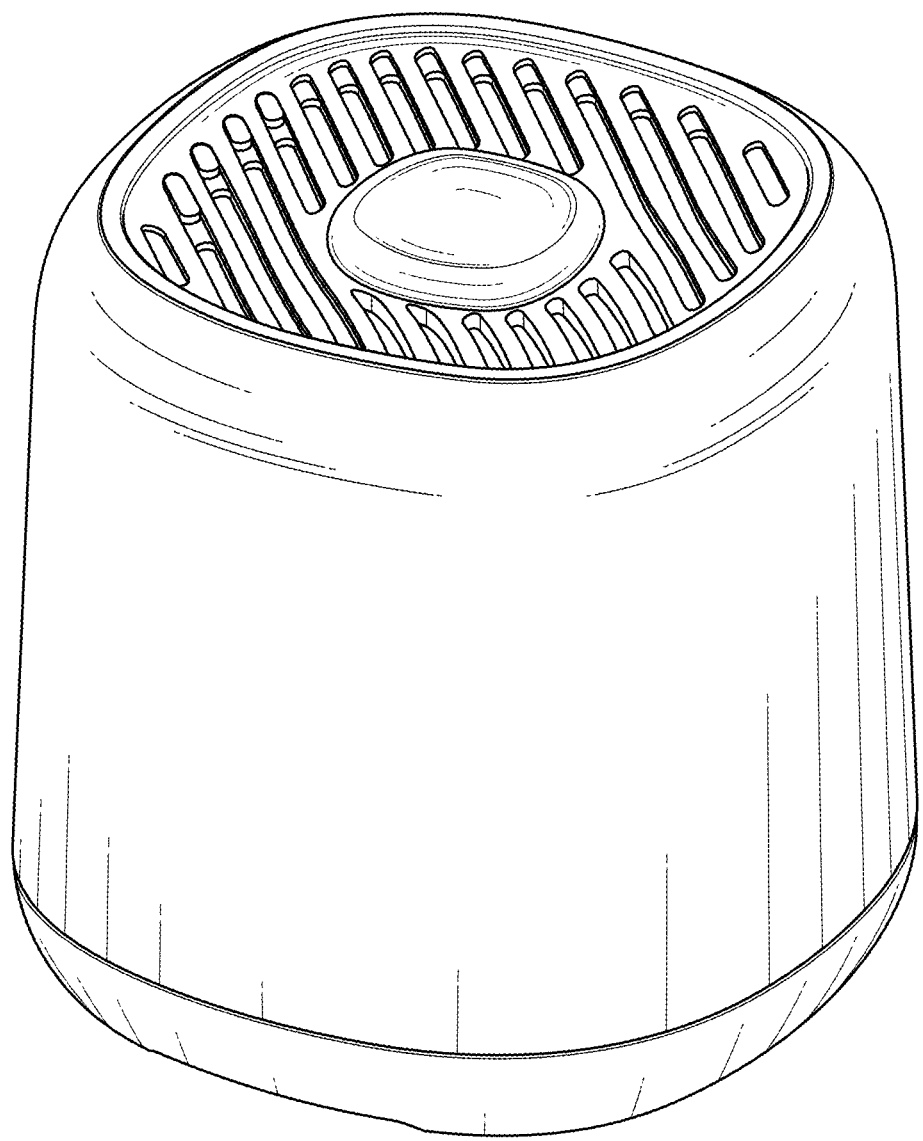
FIG. 1 is a perspective view of an aroma diffuser device according to a first embodiment.
Figure 2:
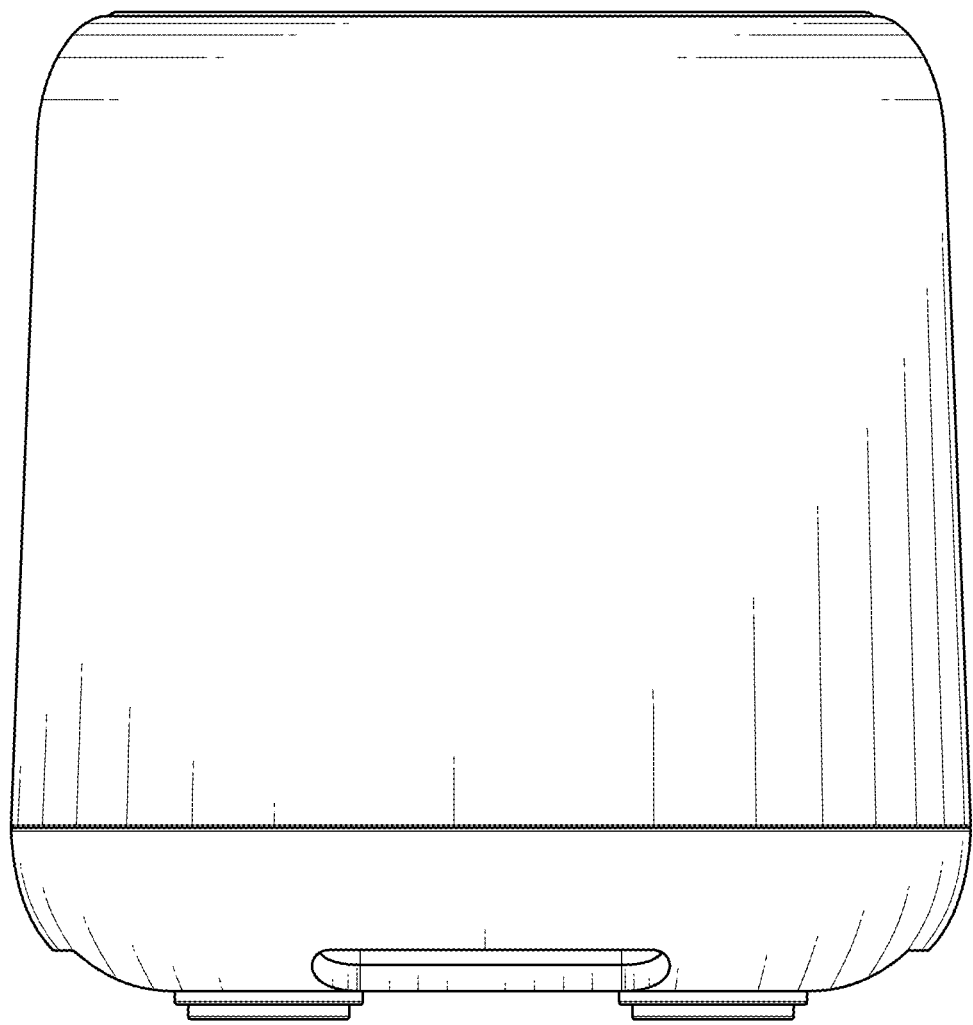
FIG. 2 is a front view thereof.
Figure 3:
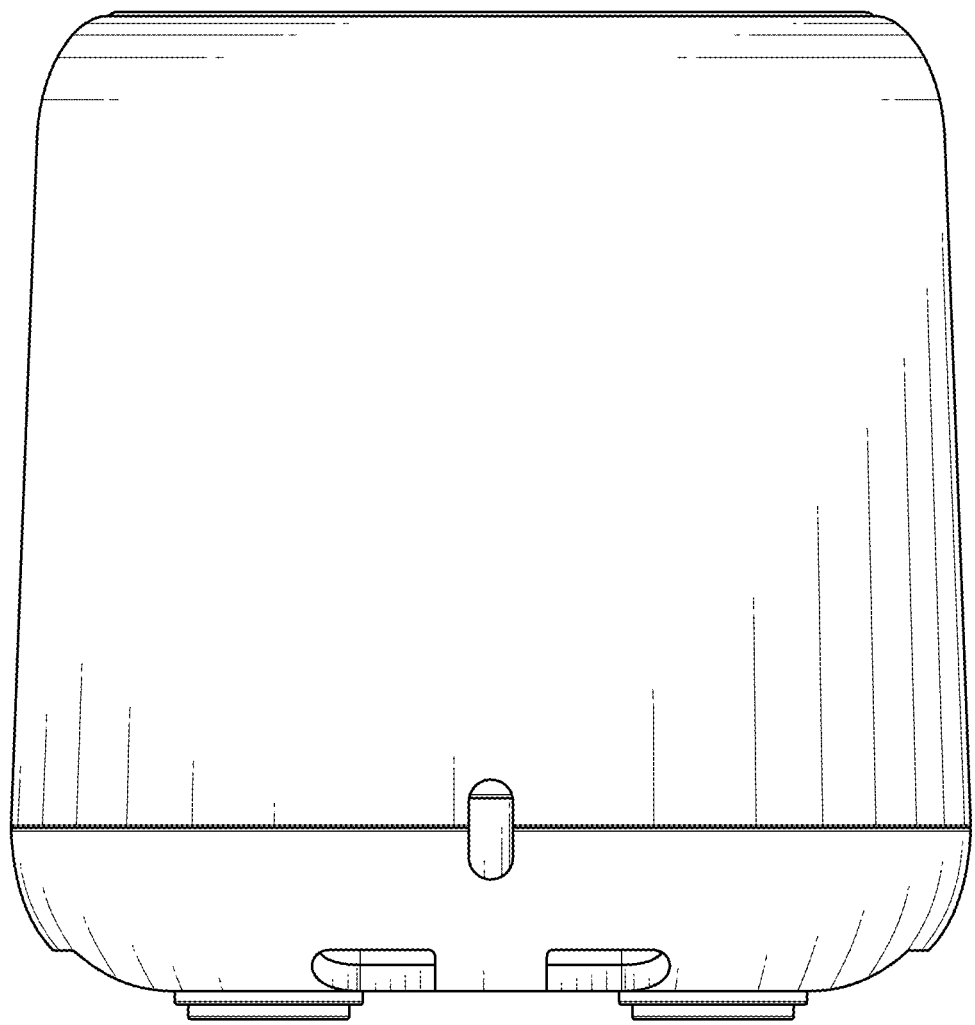
FIG. 3 is a back view thereof.
Figure 4:
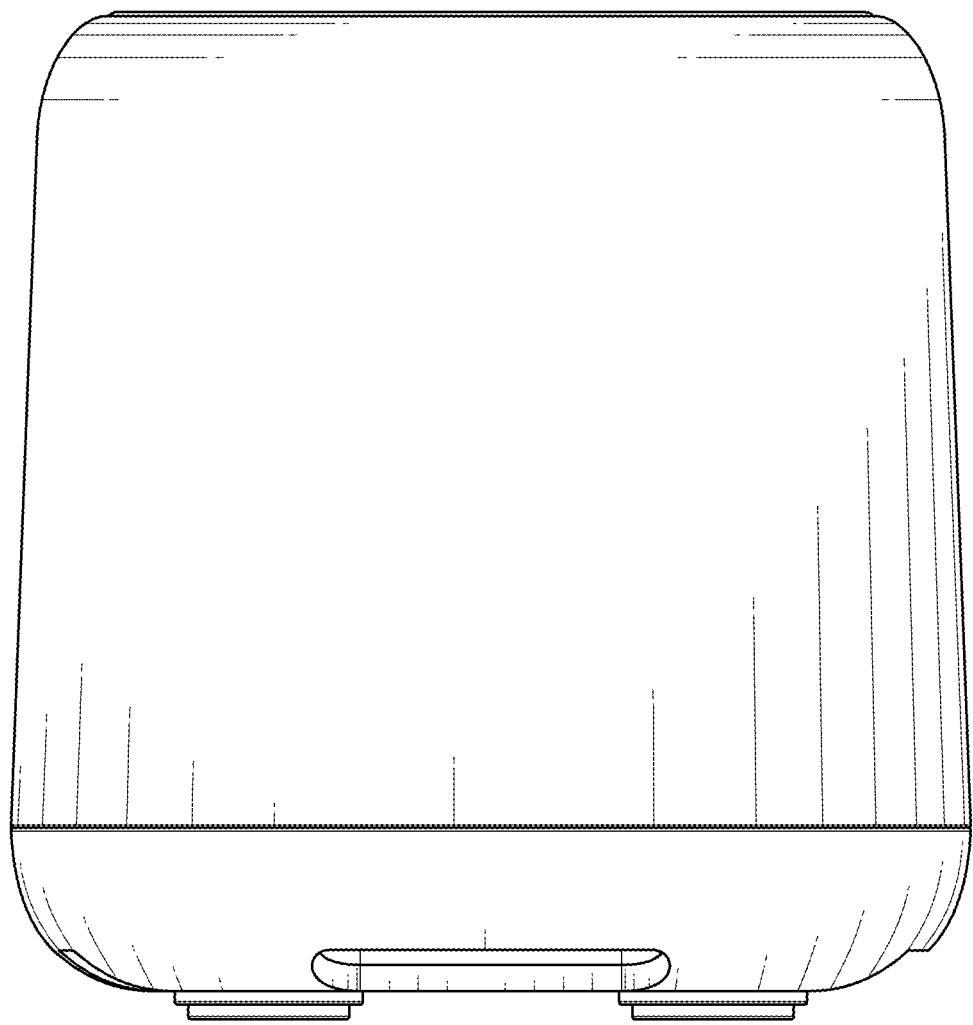
FIG. 4 is left view thereof.
Figure 5:
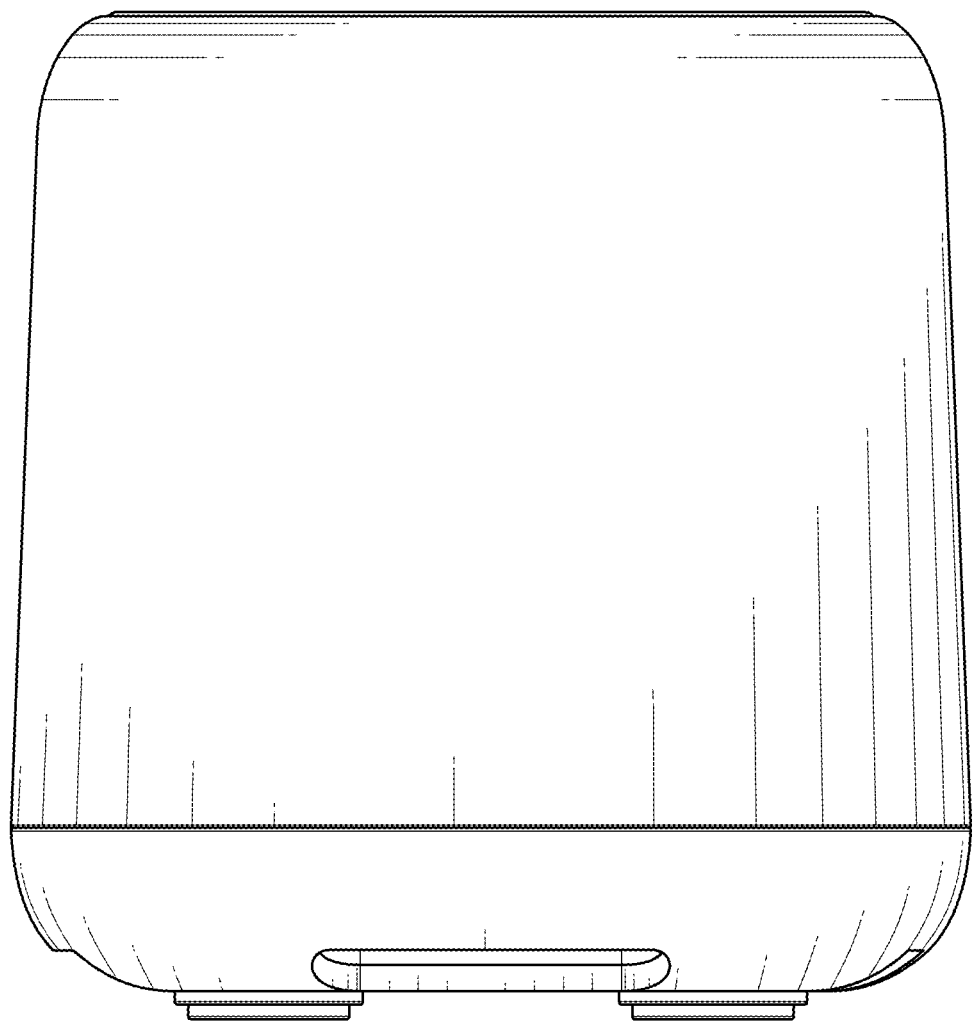
FIG. 5 is a right view thereof.
Figure 6:
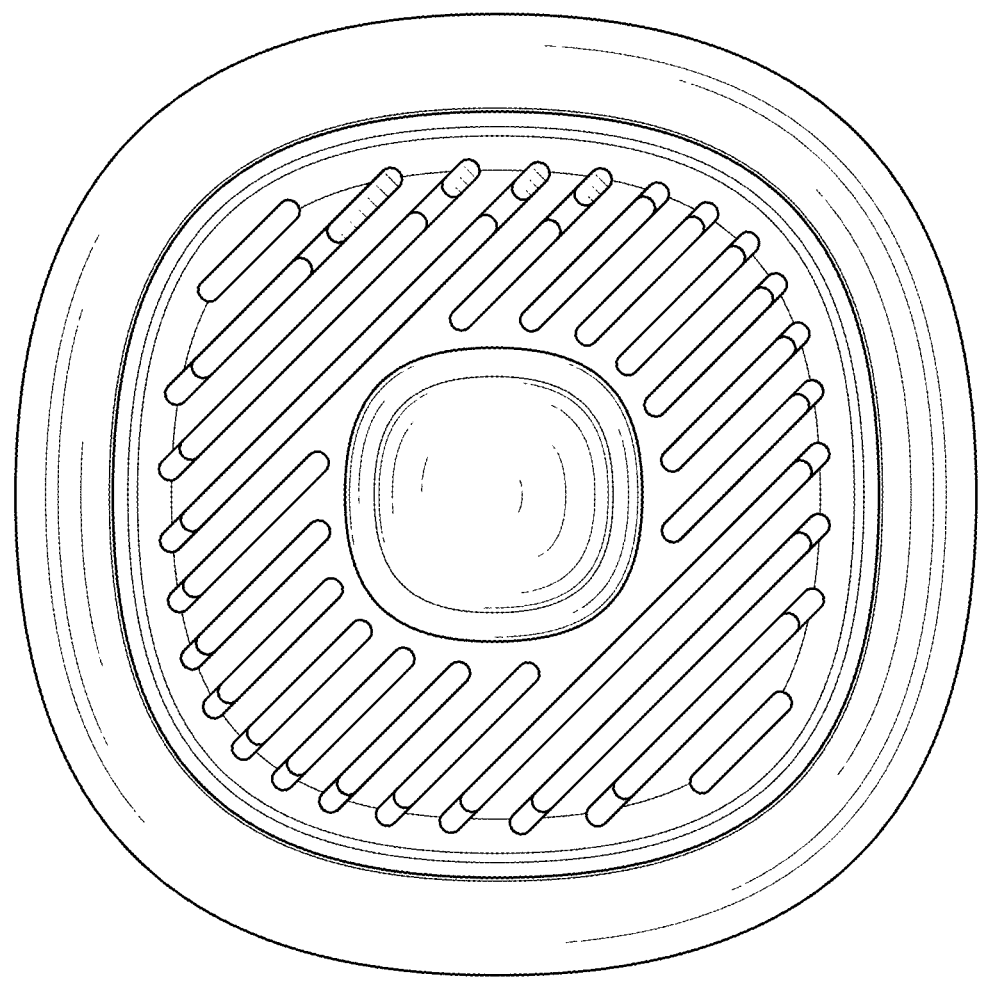
FIG. 6 is a top view thereof.
Figure 7:
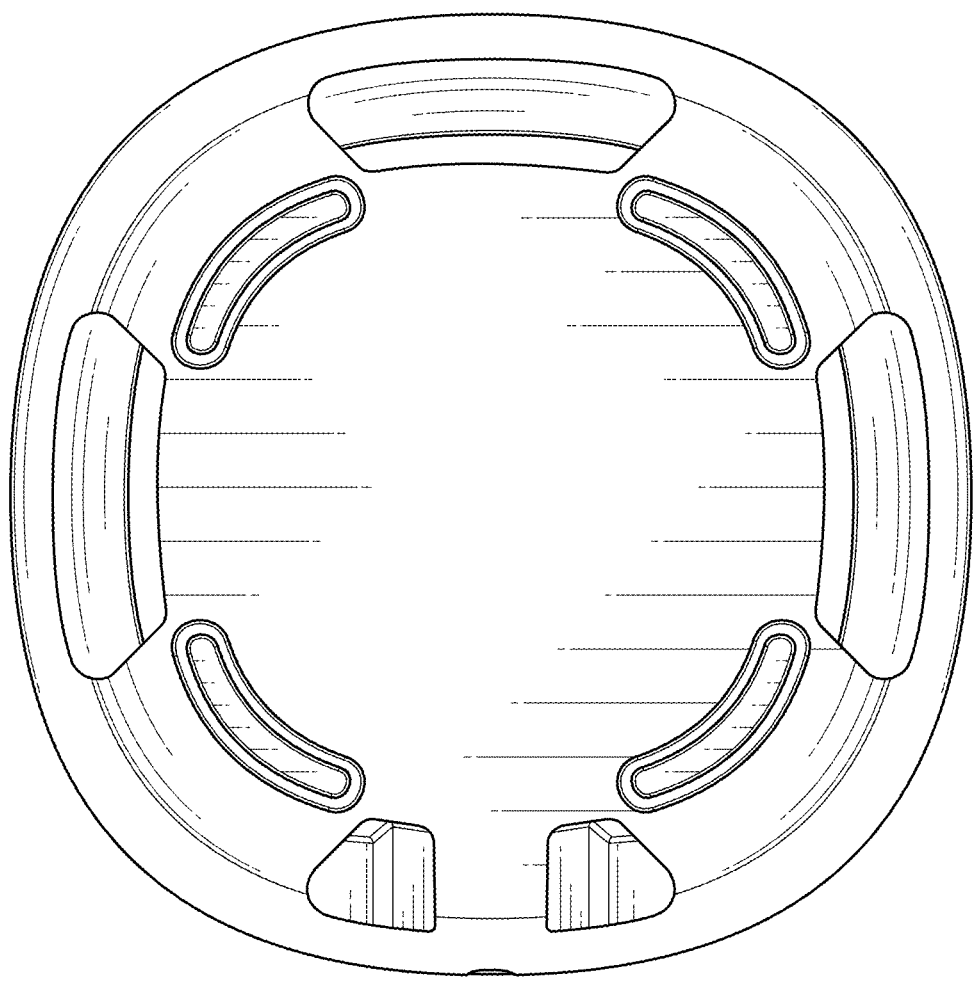
FIG. 7 is a bottom view thereof.
Figure 8:
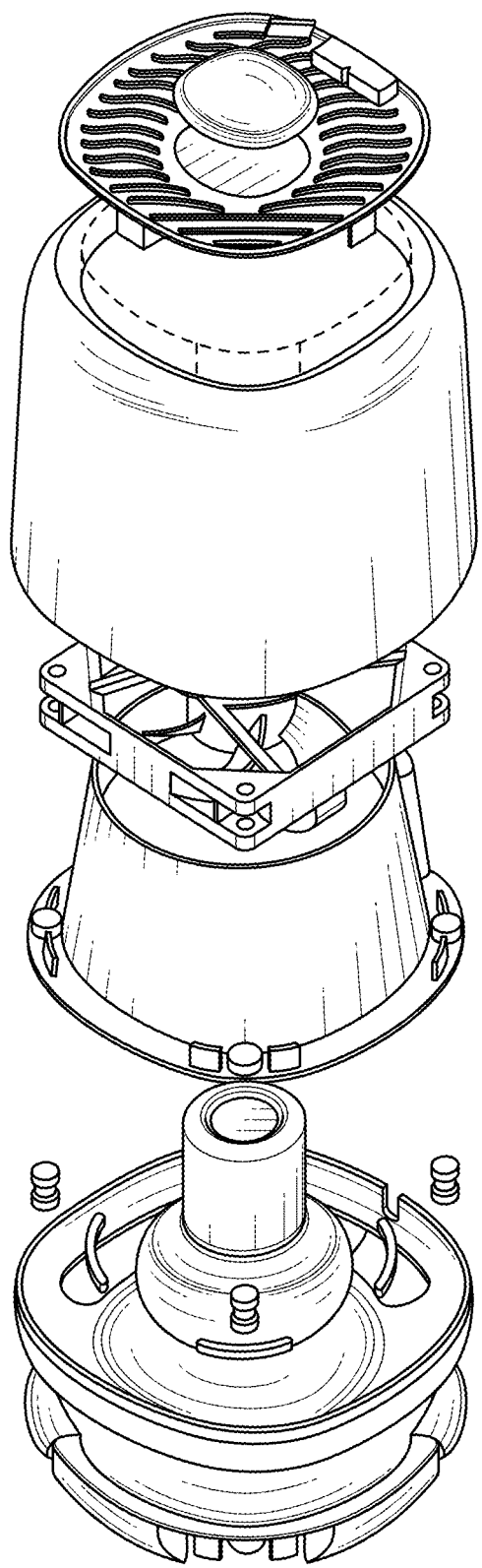
FIG. 8 is an exploded view thereof.
Figure 9:
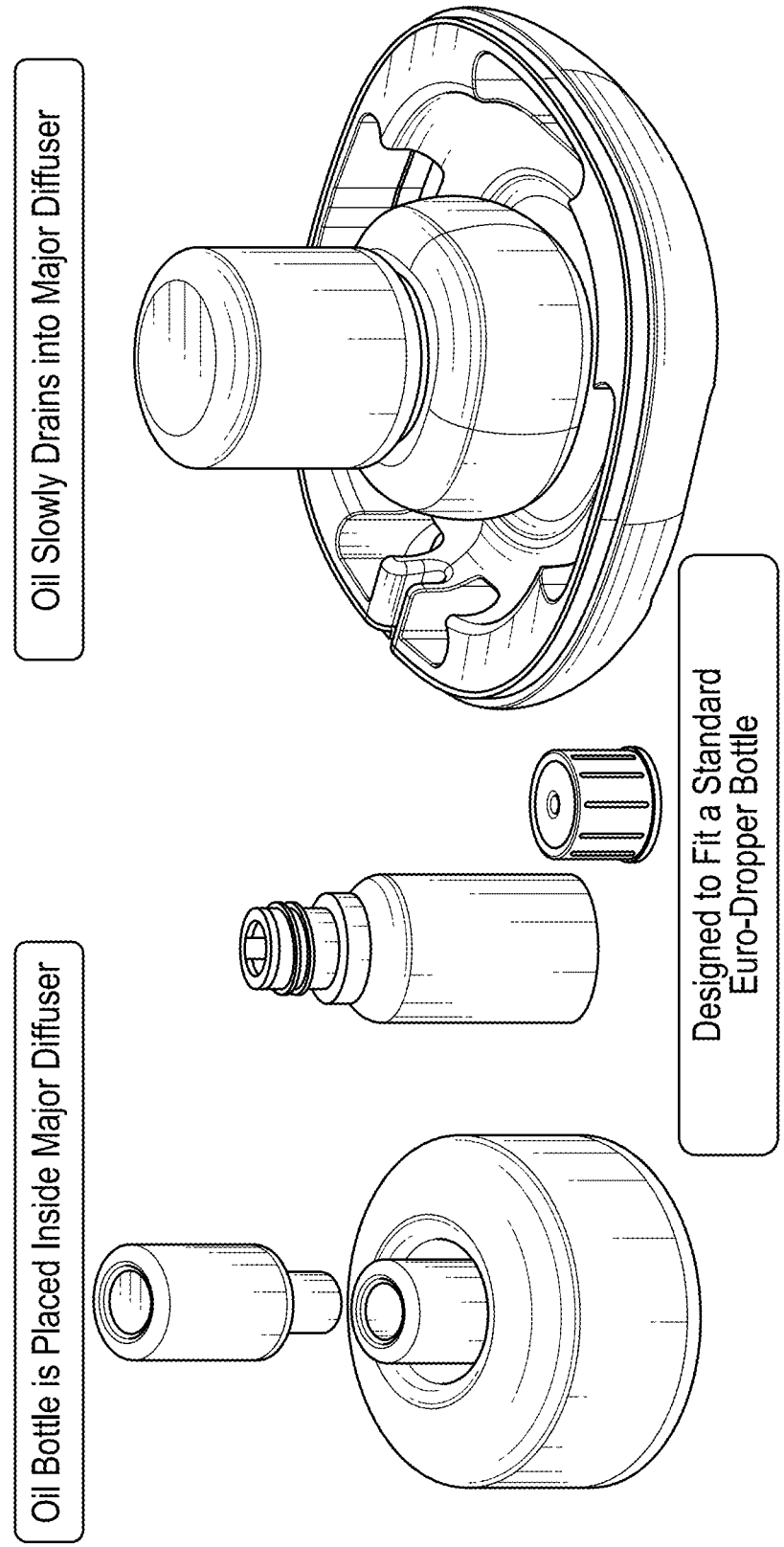
FIG. 9 illustrates insertion of an aroma bottle into a major diffuser and placement of the major diffuser in a bottom portion of the aroma diffuser device.
Figure 10:
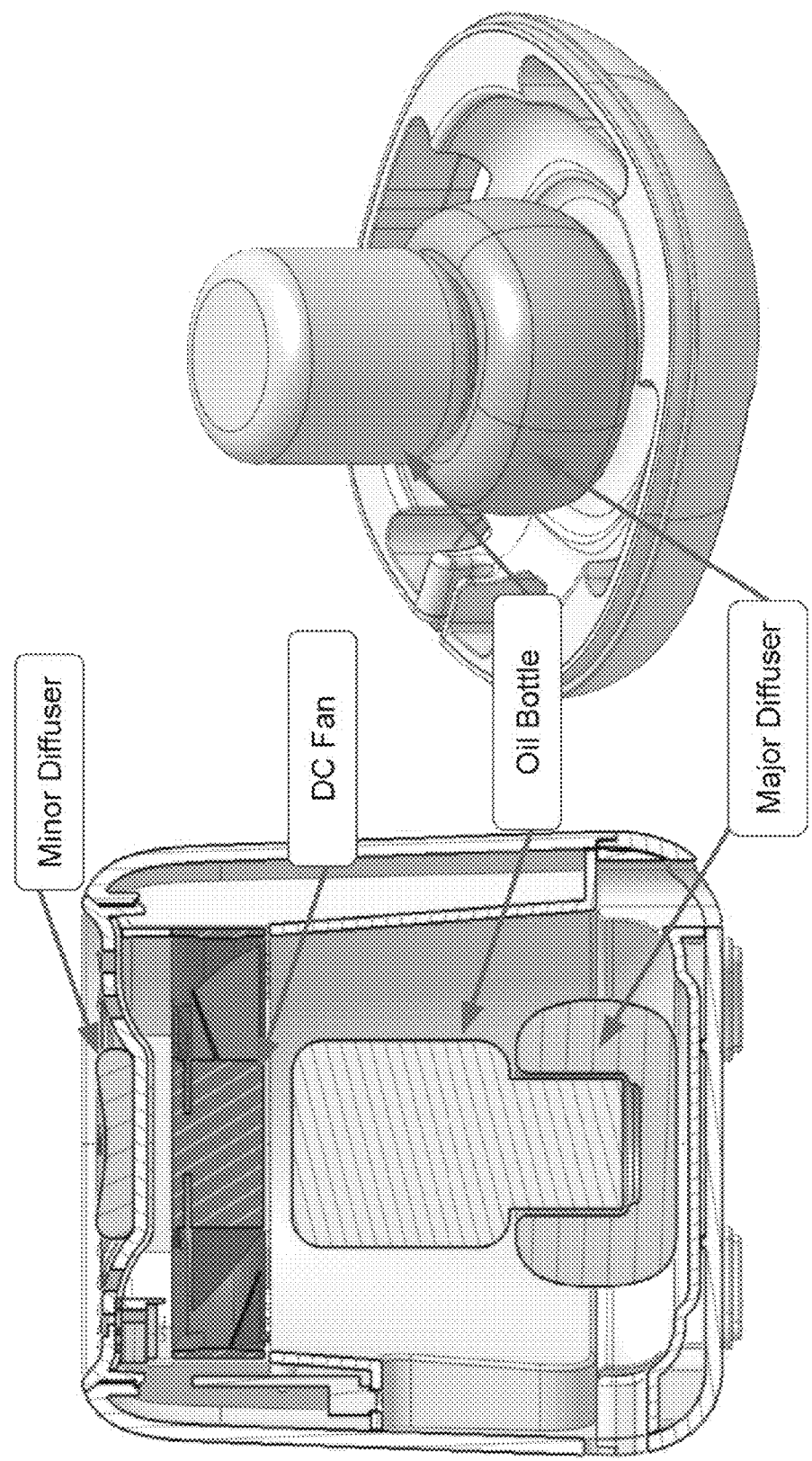
FIG. 10 illustrates a cross section cutaway view of the aroma diffuser device along with a perspective view of the bottom portion of the aroma diffuser device.
Figure 11:
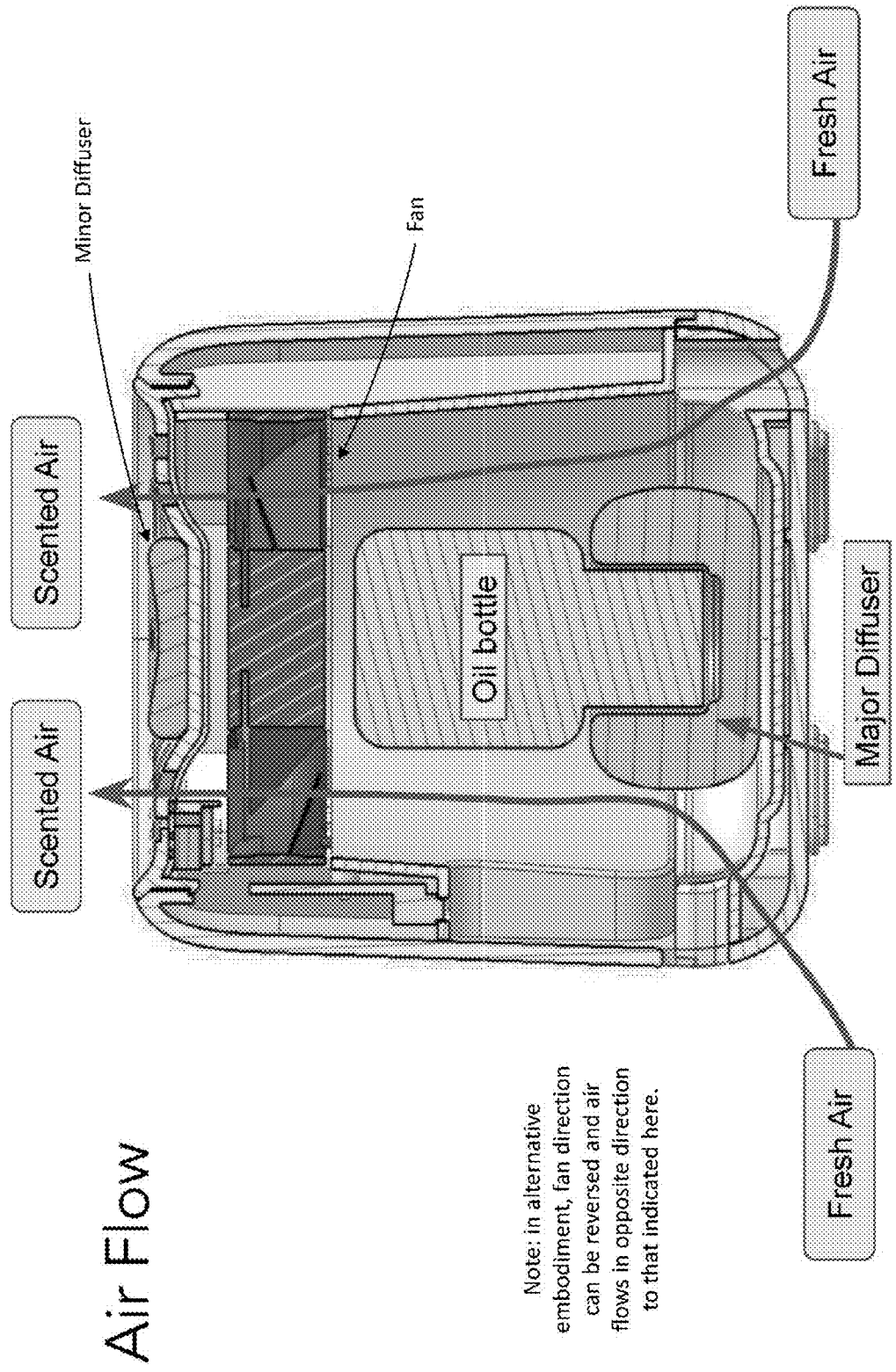
FIG. 11 illustrates a cross section cutaway view of the aroma diffuser device showing air flow.

FIGS. 1-7 illustrate various views of an aroma diffuser device in accordance with a first embodiment. FIG. 8 is an exploded view of the embodiment. FIG. 9 illustrates insertion of an aroma bottle into a major diffuser and placement of the major diffuser in a bottom portion of the aroma diffuser device. FIG. 10 illustrates a cross section cutaway view of the aroma diffuser device along with a perspective view of the bottom portion of the aroma diffuser device. FIG. 11 illustrates a cross section cutaway view of the aroma diffuser device showing air flow.

Figure 12:
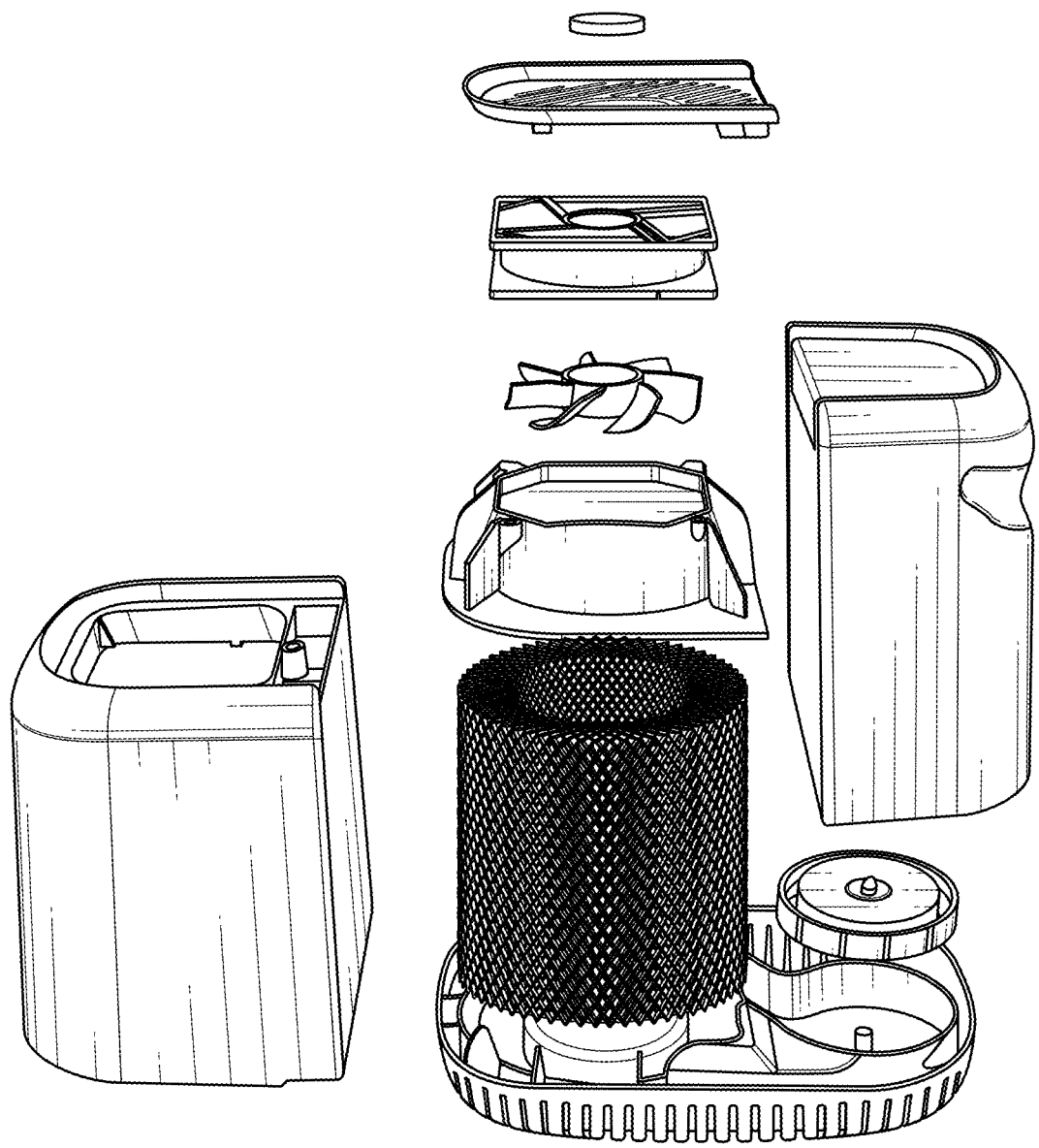
FIG. 12 illustrates an exploded view of a combined humidifier and aroma diffuser device in accordance with a second embodiment.
Figure 13:
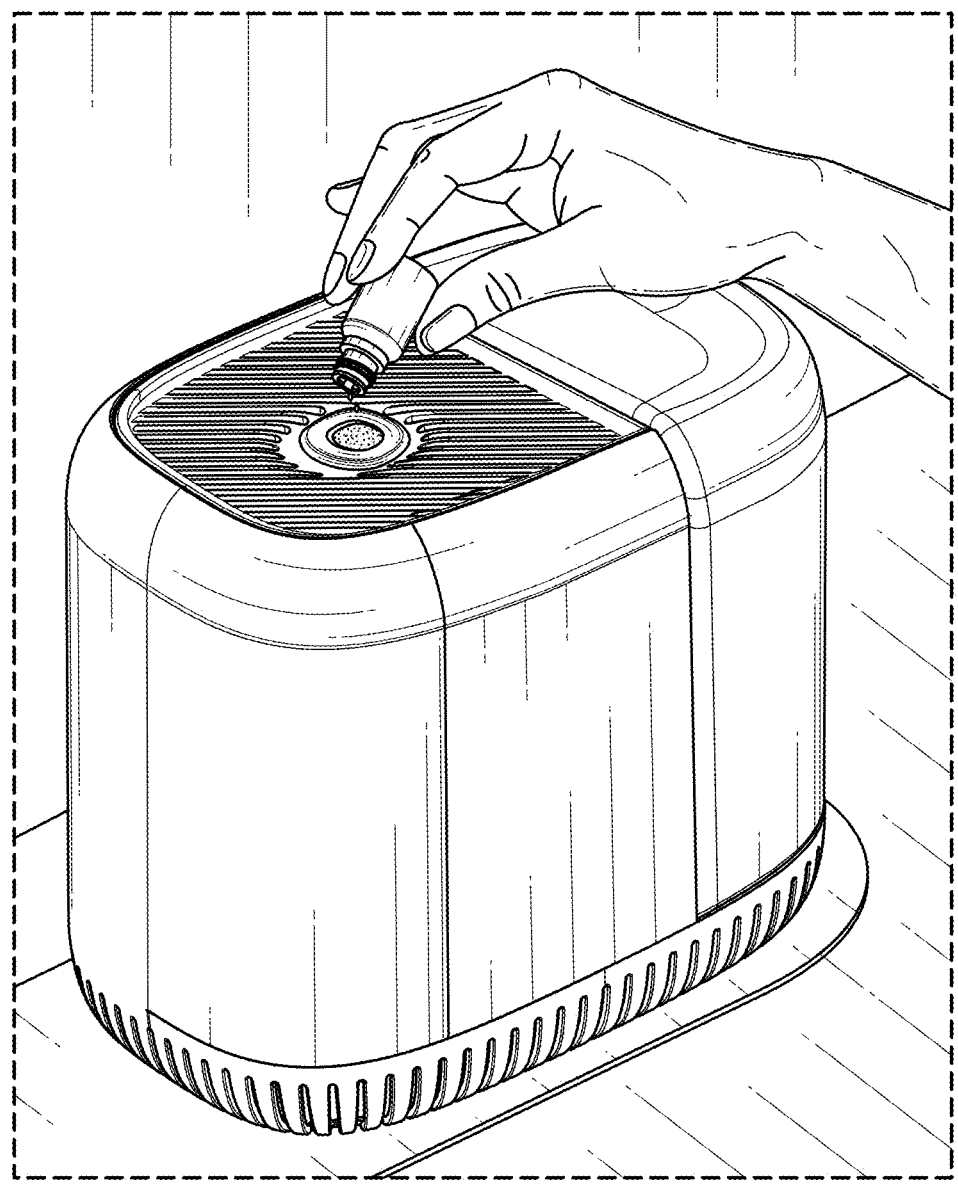
FIG. 13 illustrates the manual addition of oil on a top surface of a diffuser puck or minor diffuser placed within an airflow outlet area of an aroma diffuser device and/or humidifier.
Figure 14A:
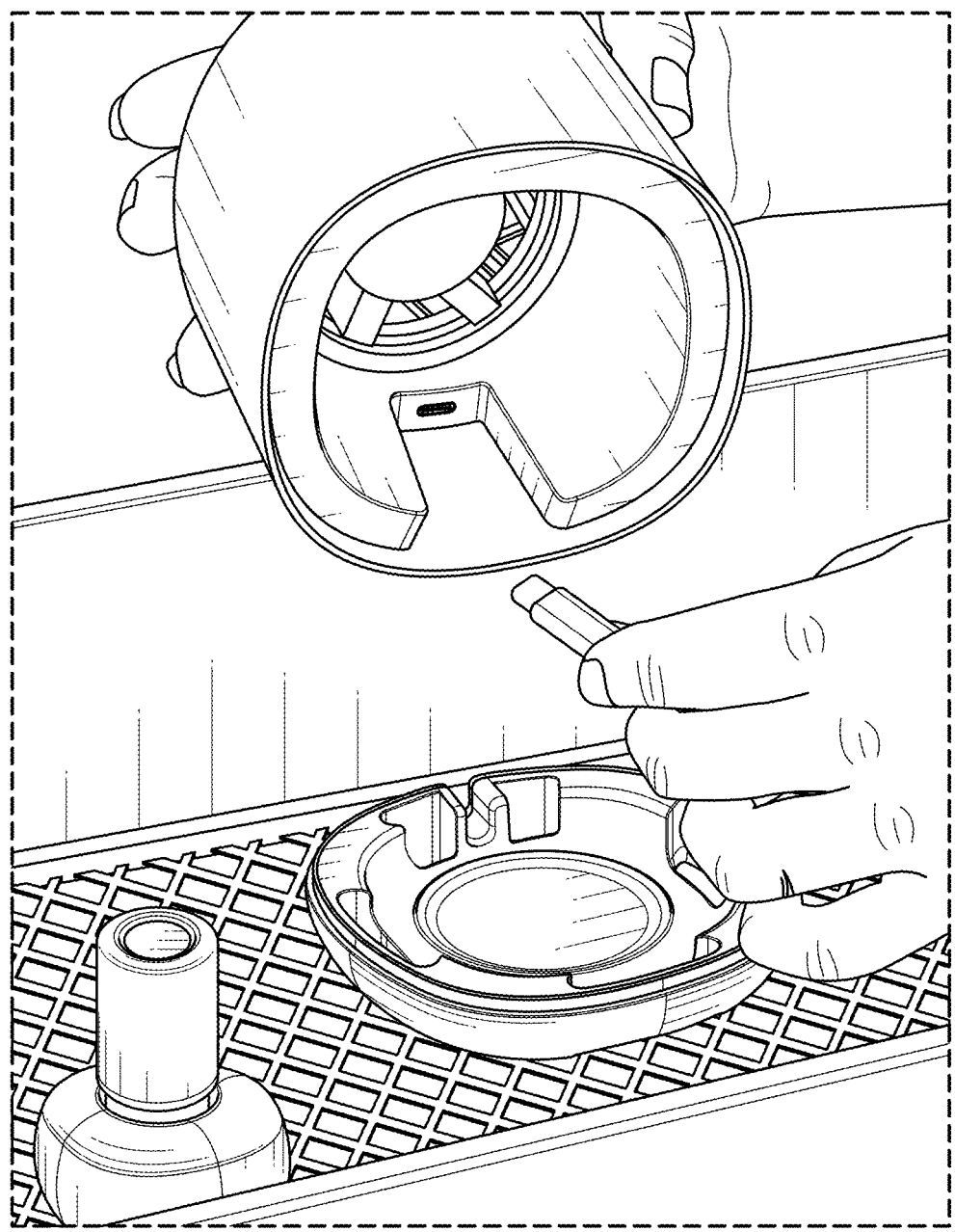
FIGS. 14A-F are a first sequence of photographs showing operation of one embodiment.
Figure 14B:
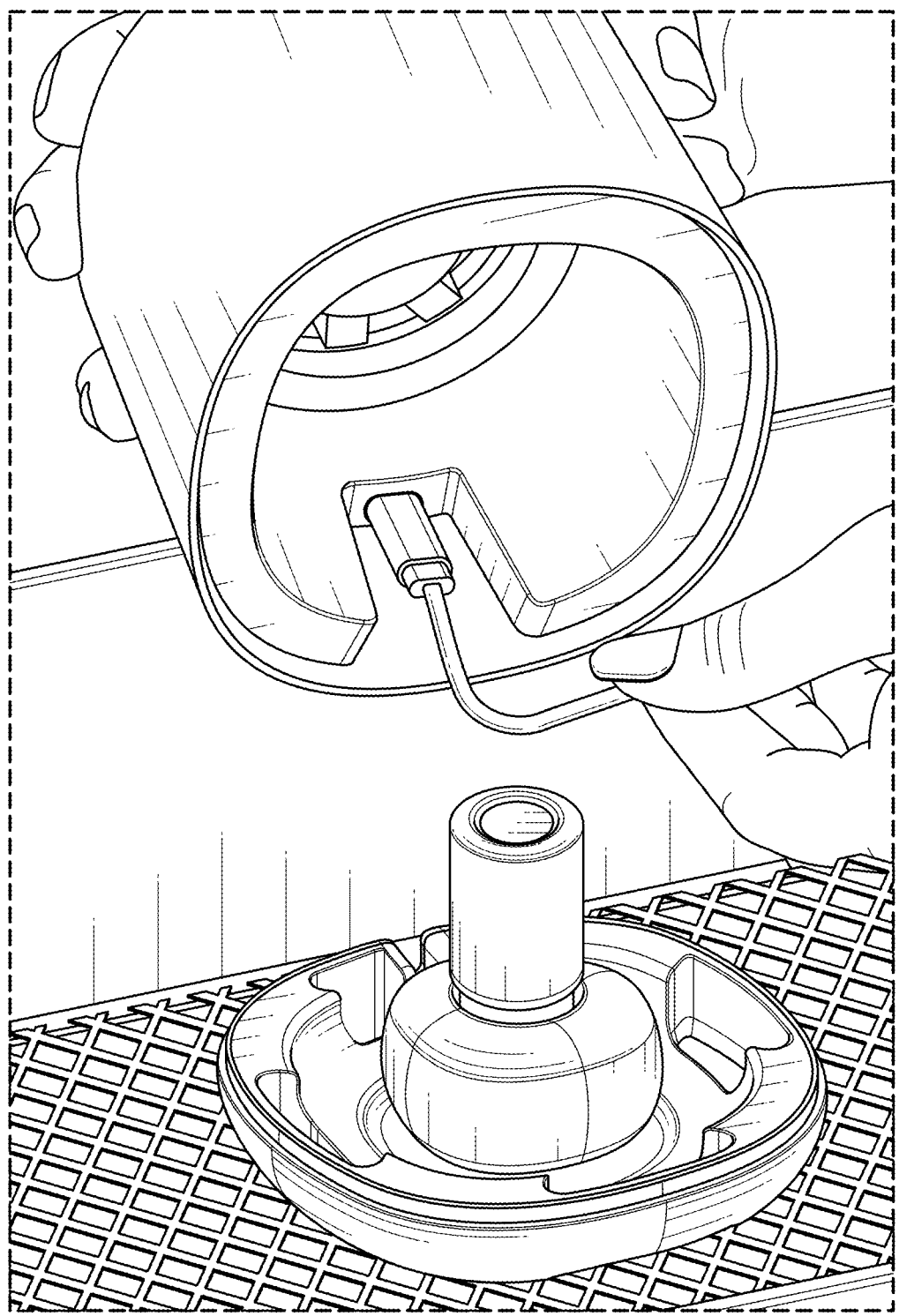
Figure 14C:
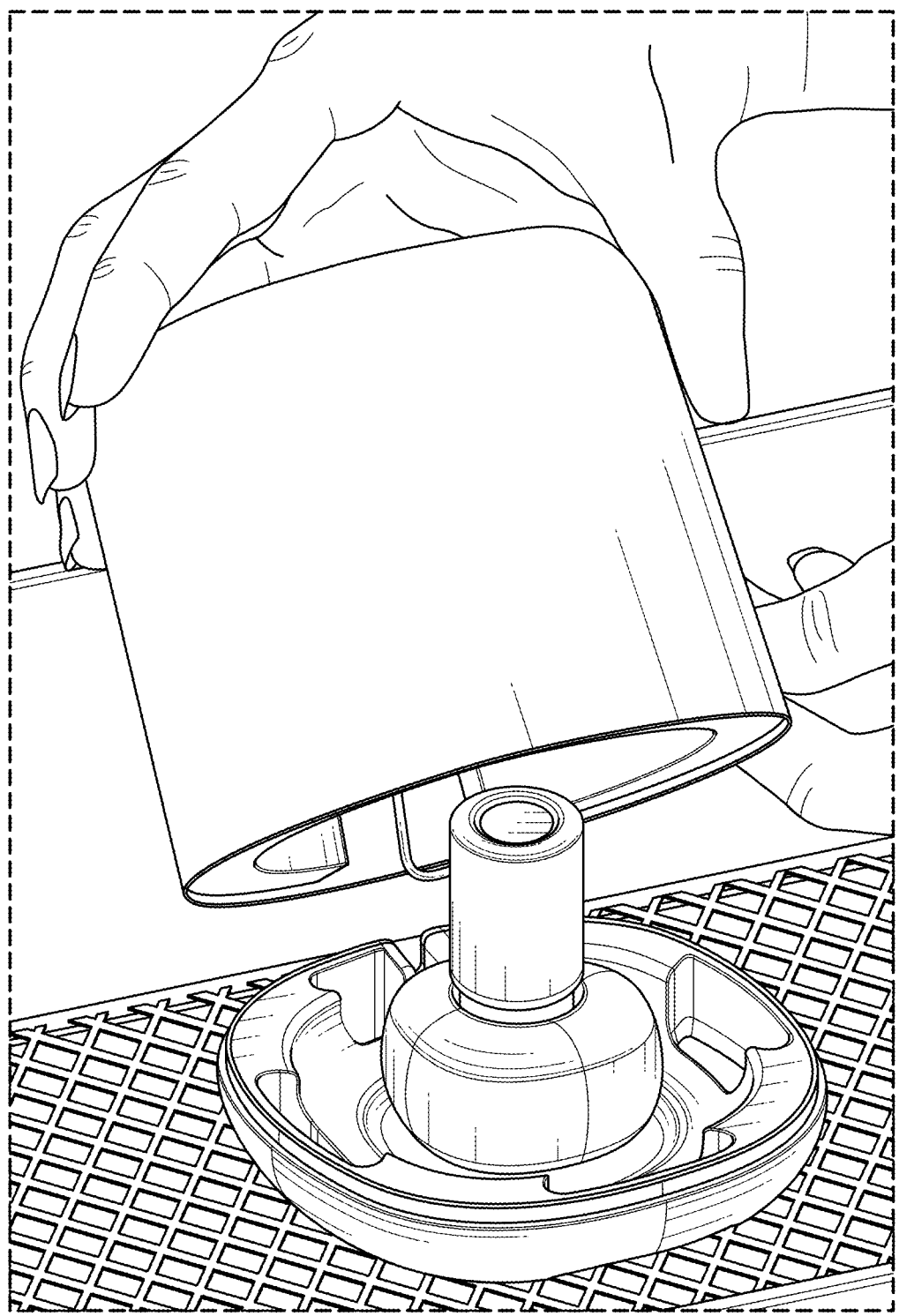
Figure 14D:
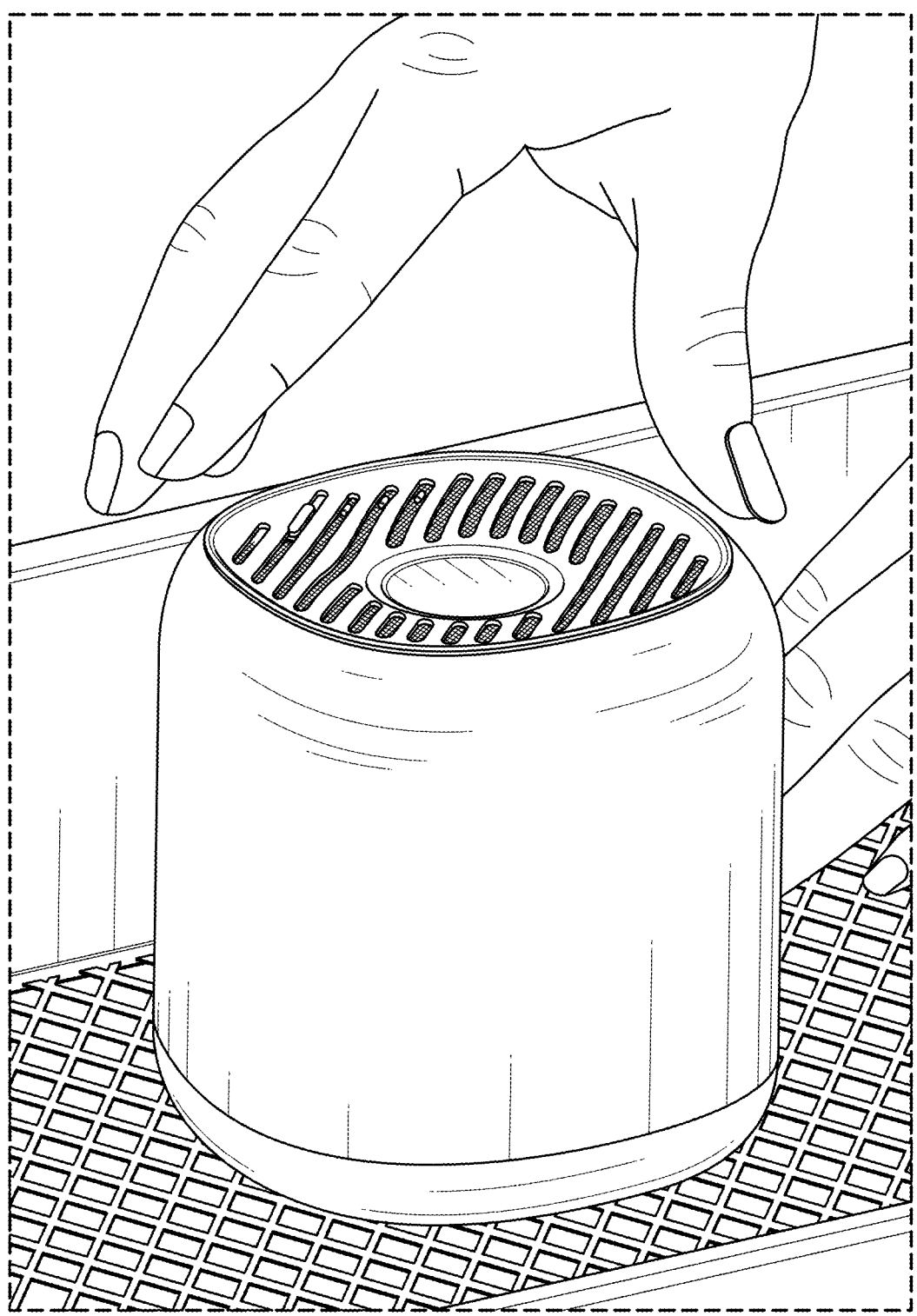
Figure 14E:
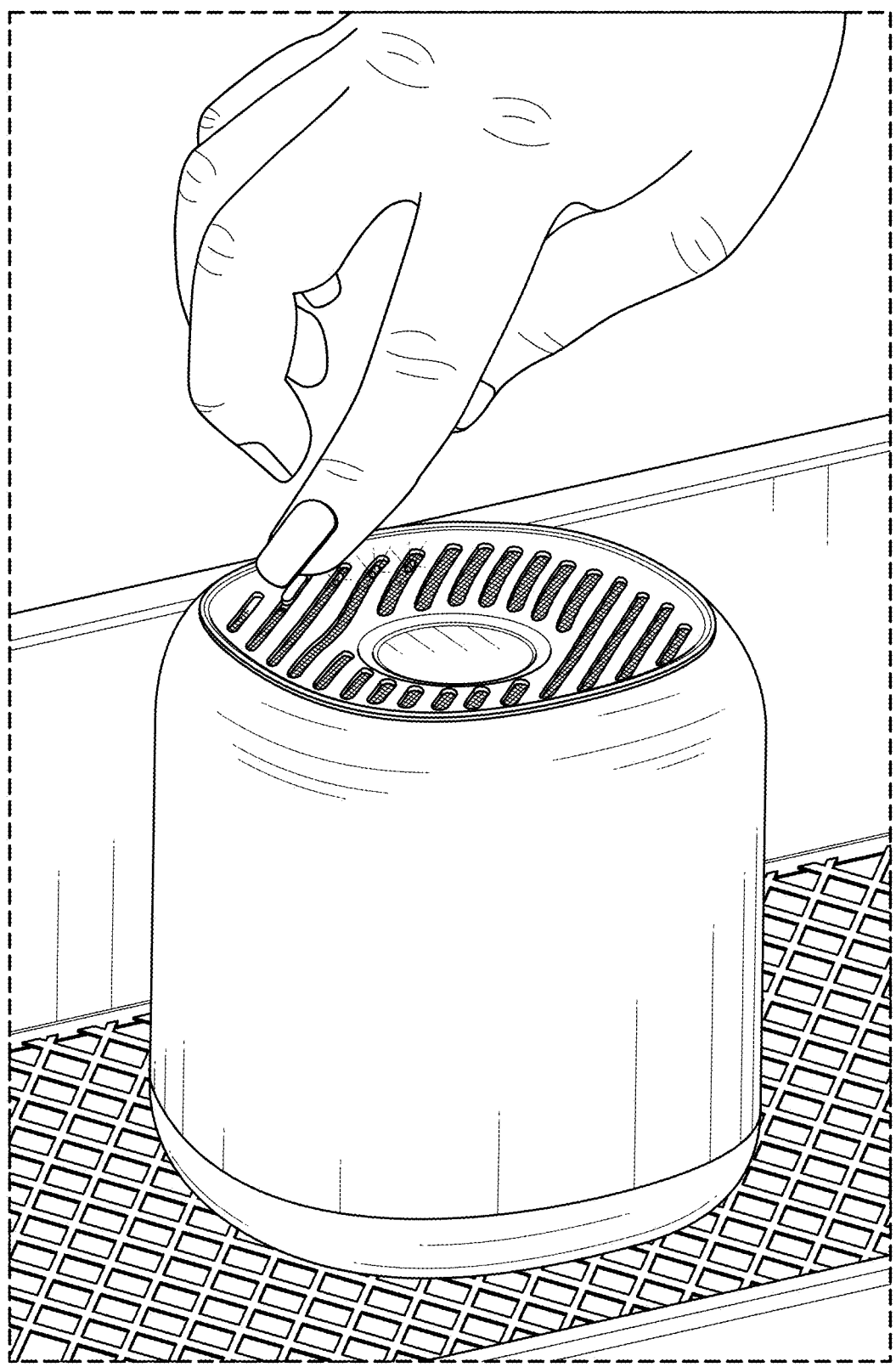
Figure 14F:
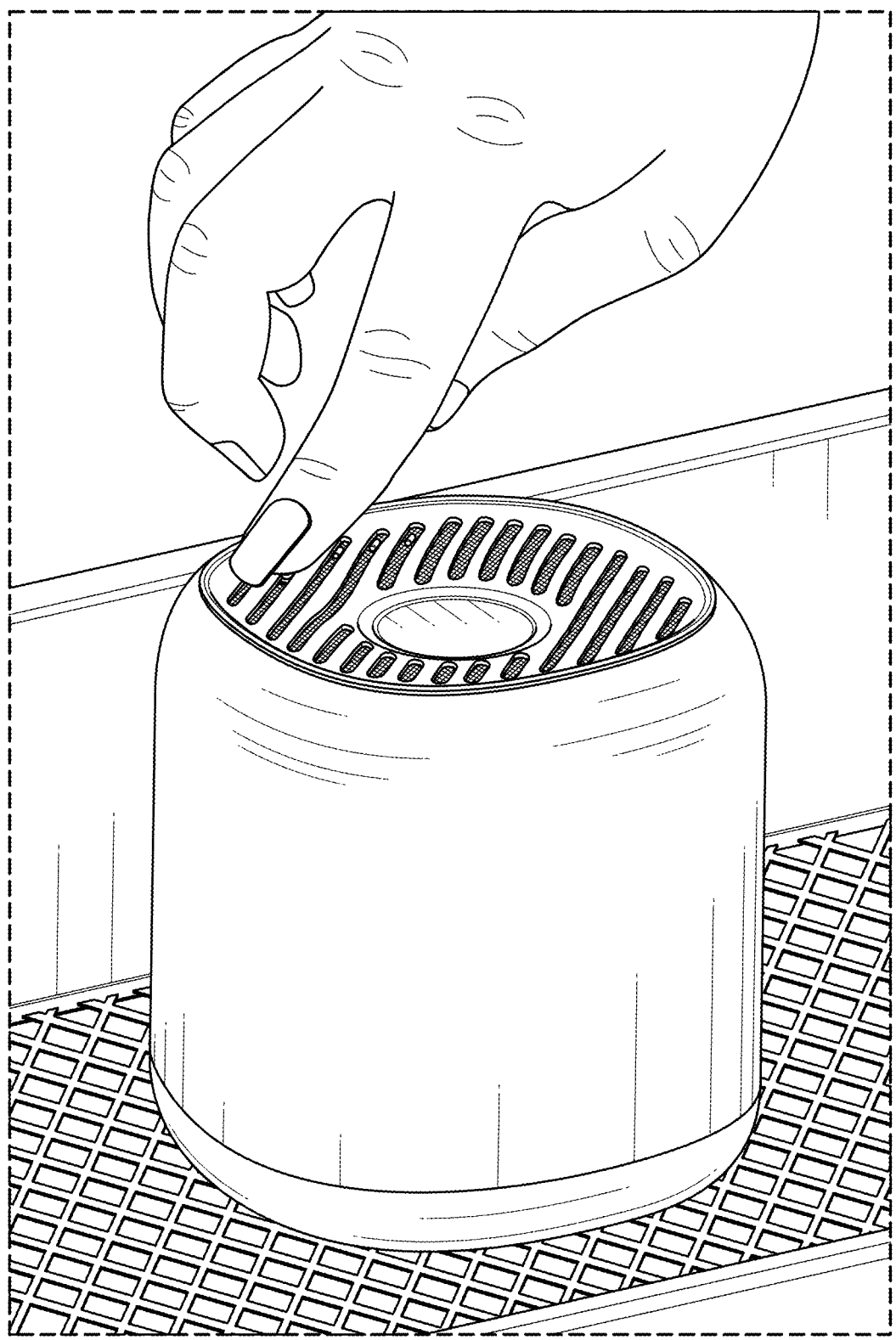
Figure 15A:
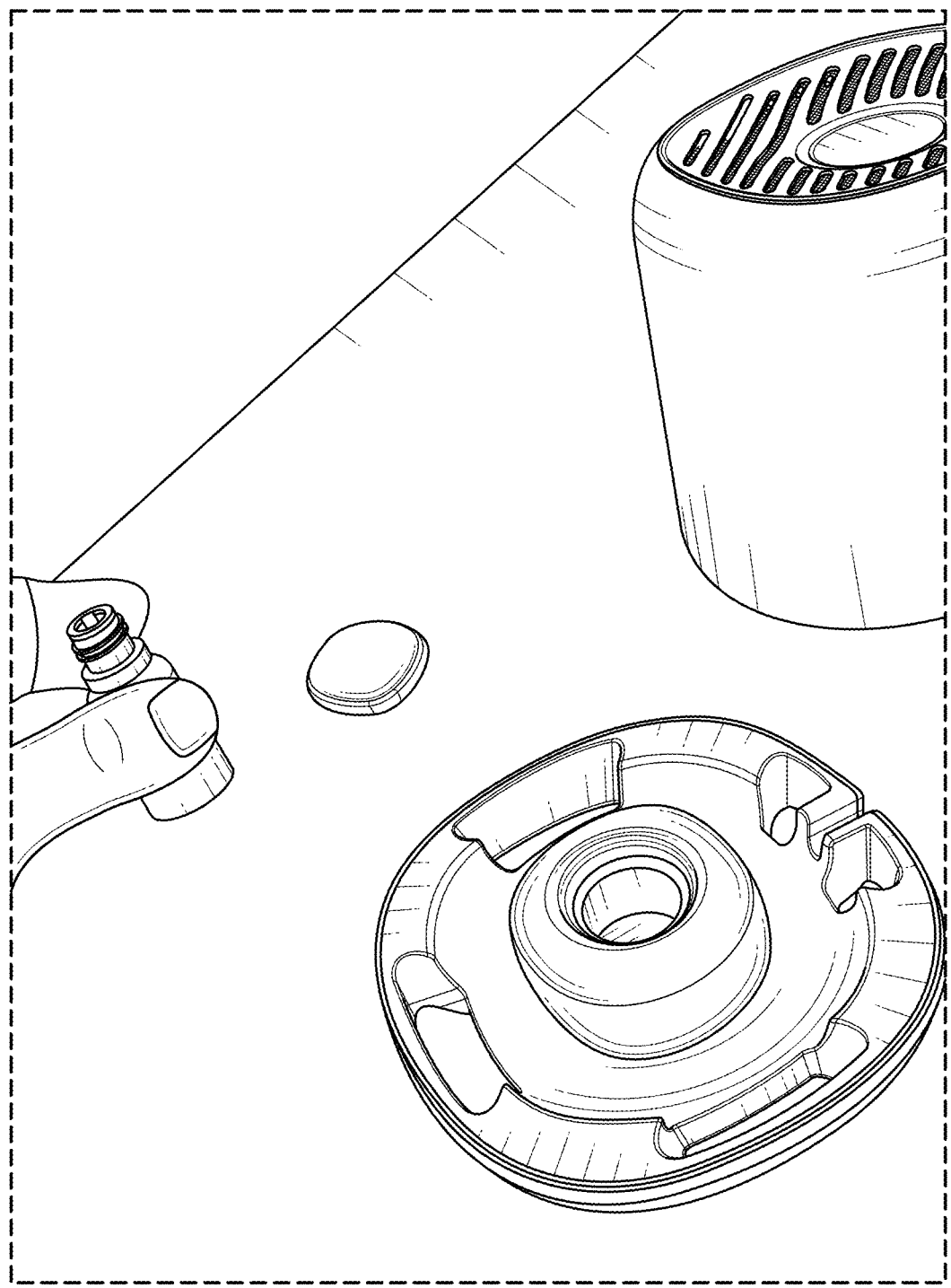
FIGS. 15A-F are a second sequence of photographs showing operation of one embodiment.
Figure 15B:
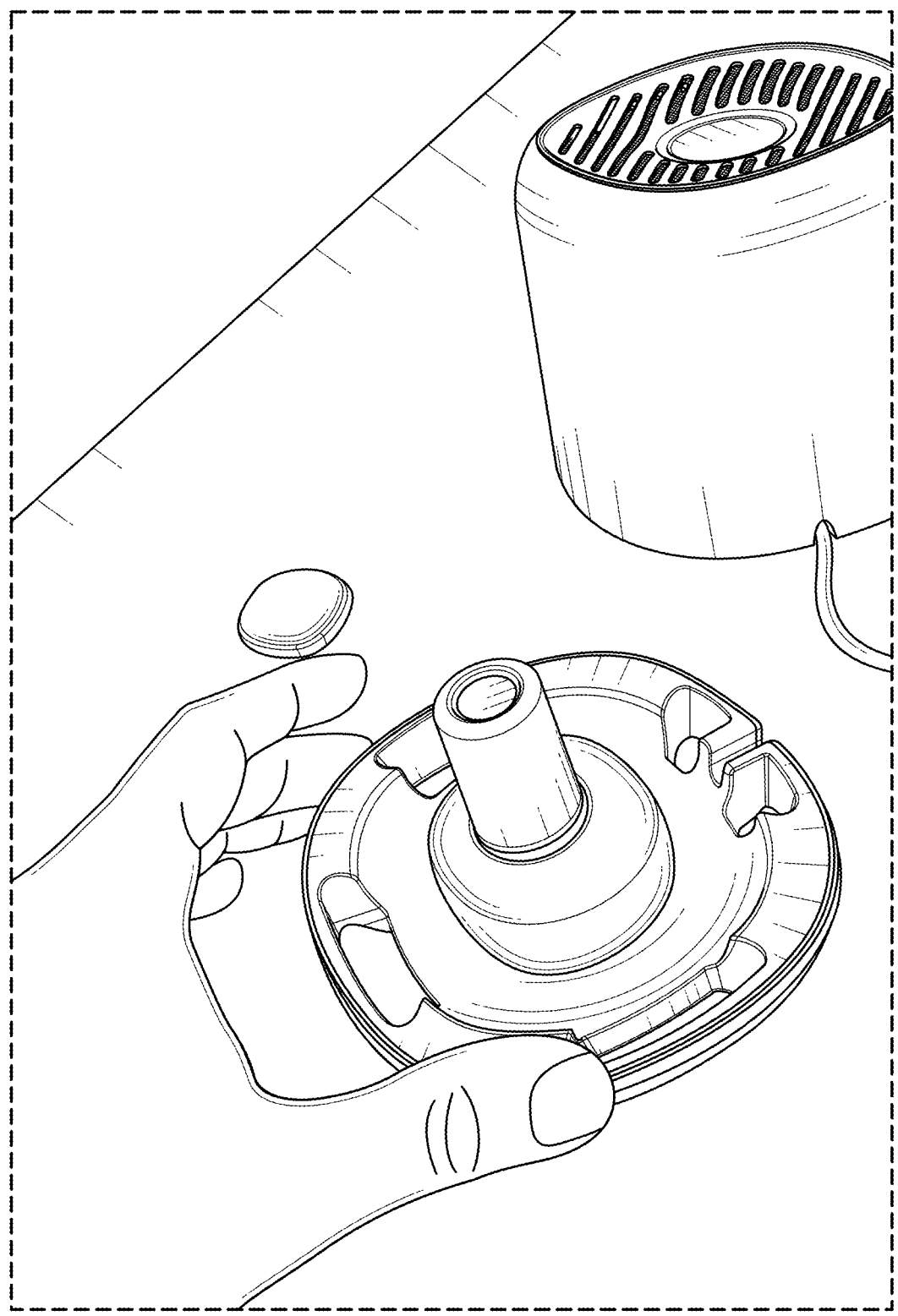
Figure 15C:
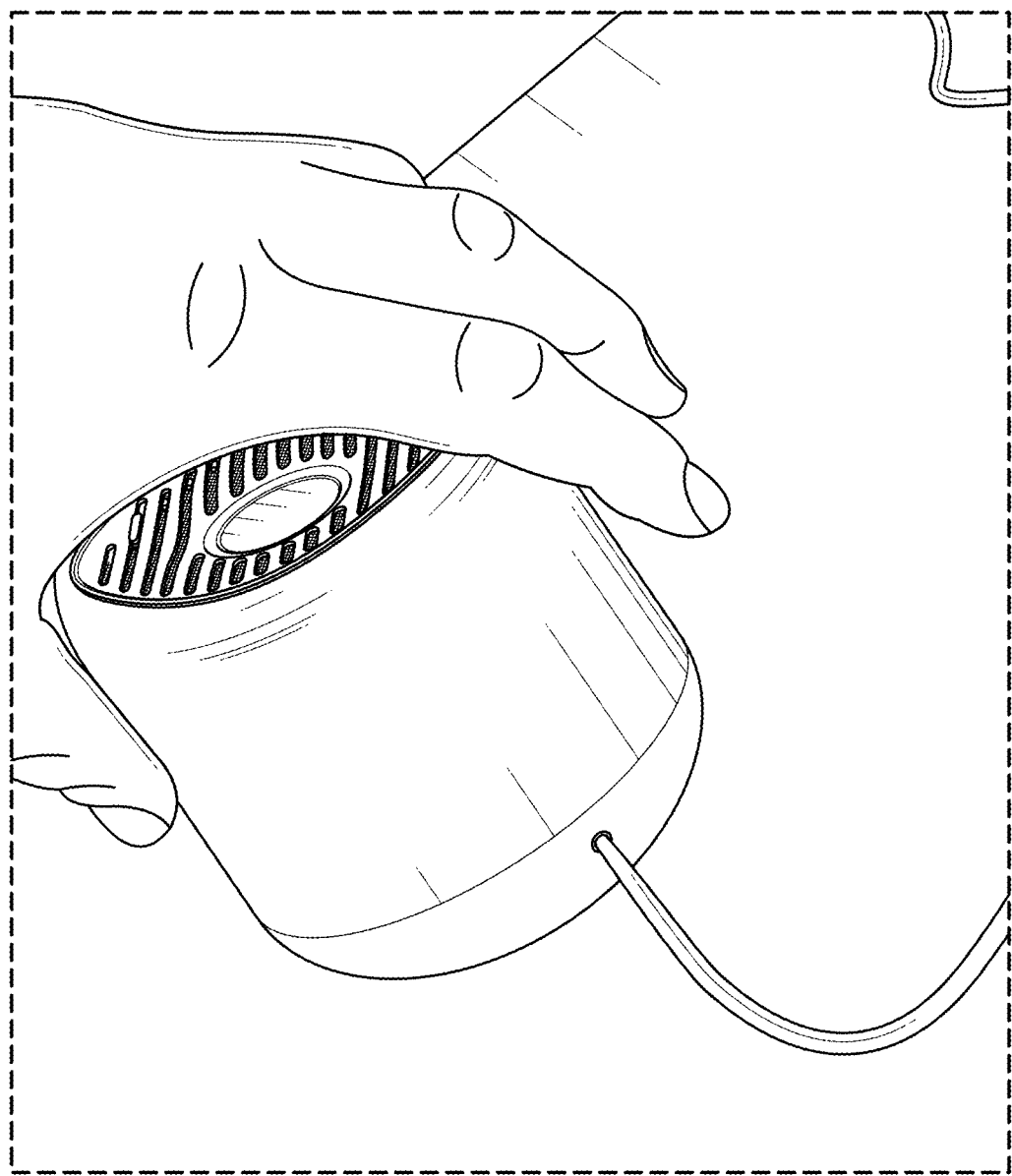
Figure 15D:
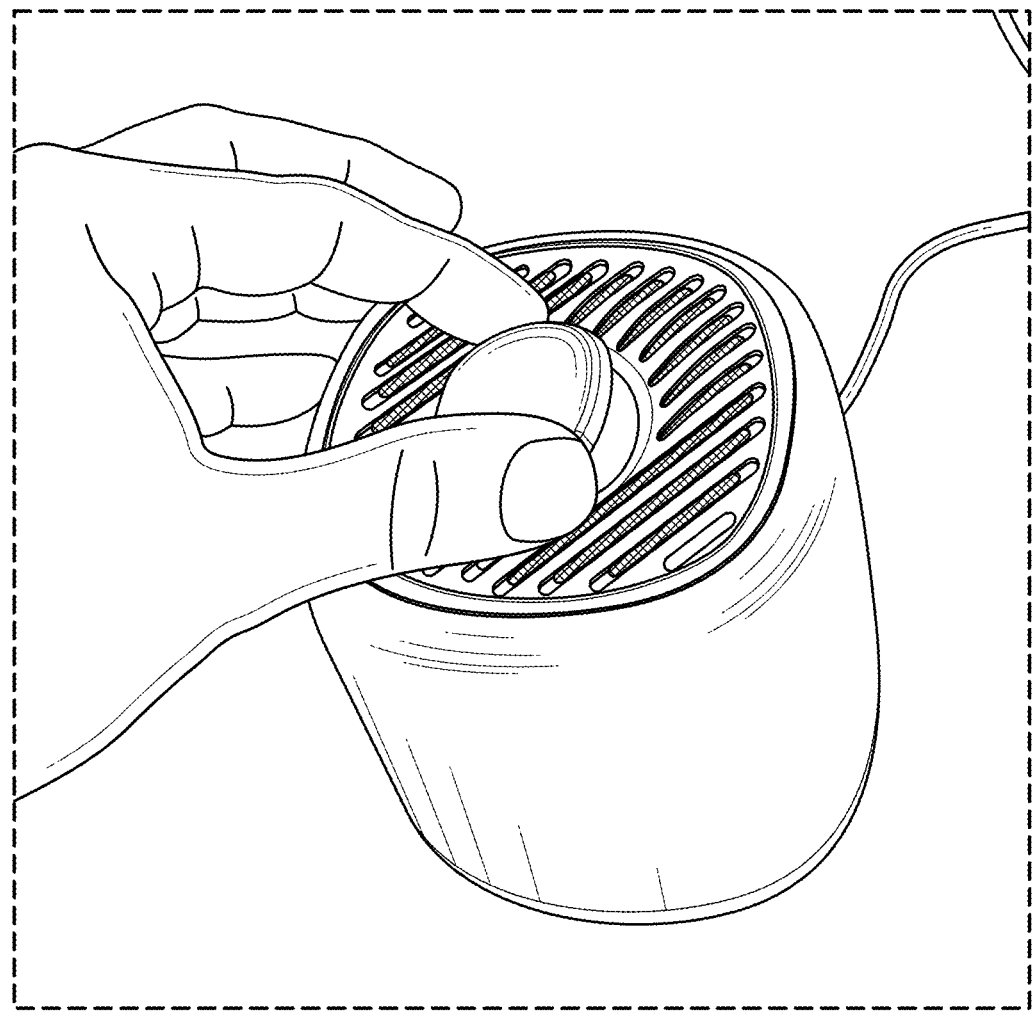
Figure 15E:
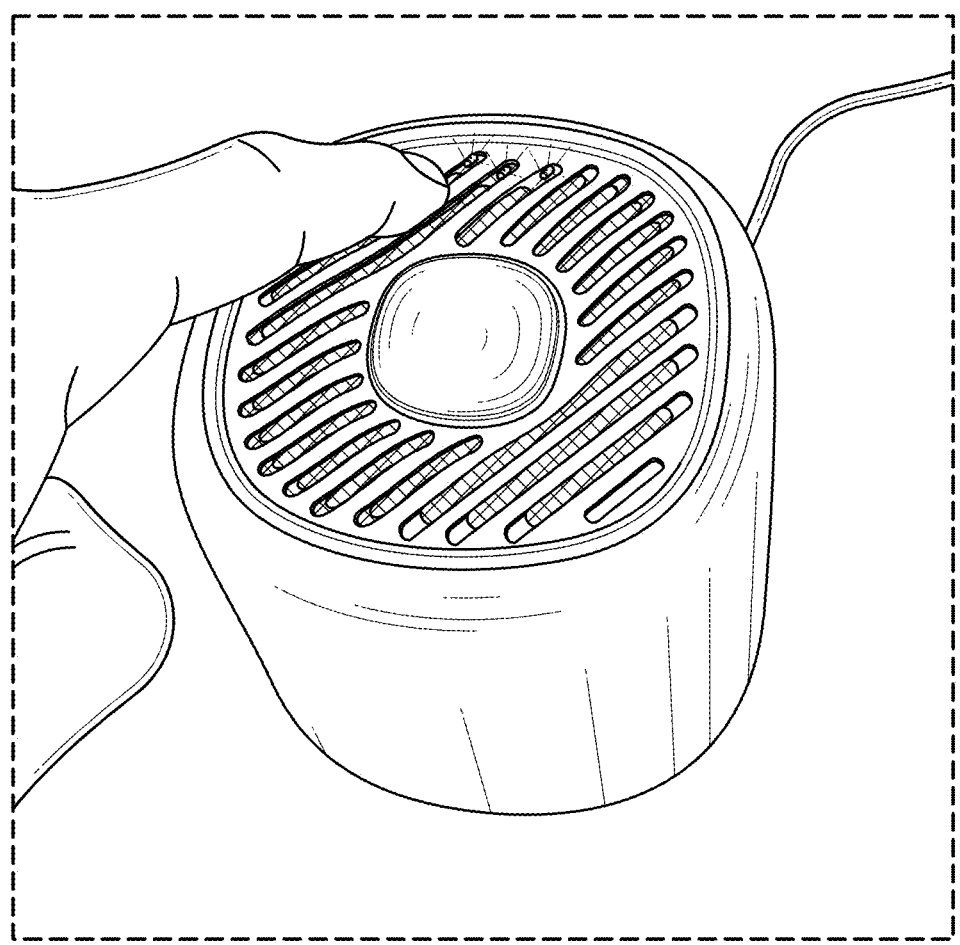
Figure 15F:
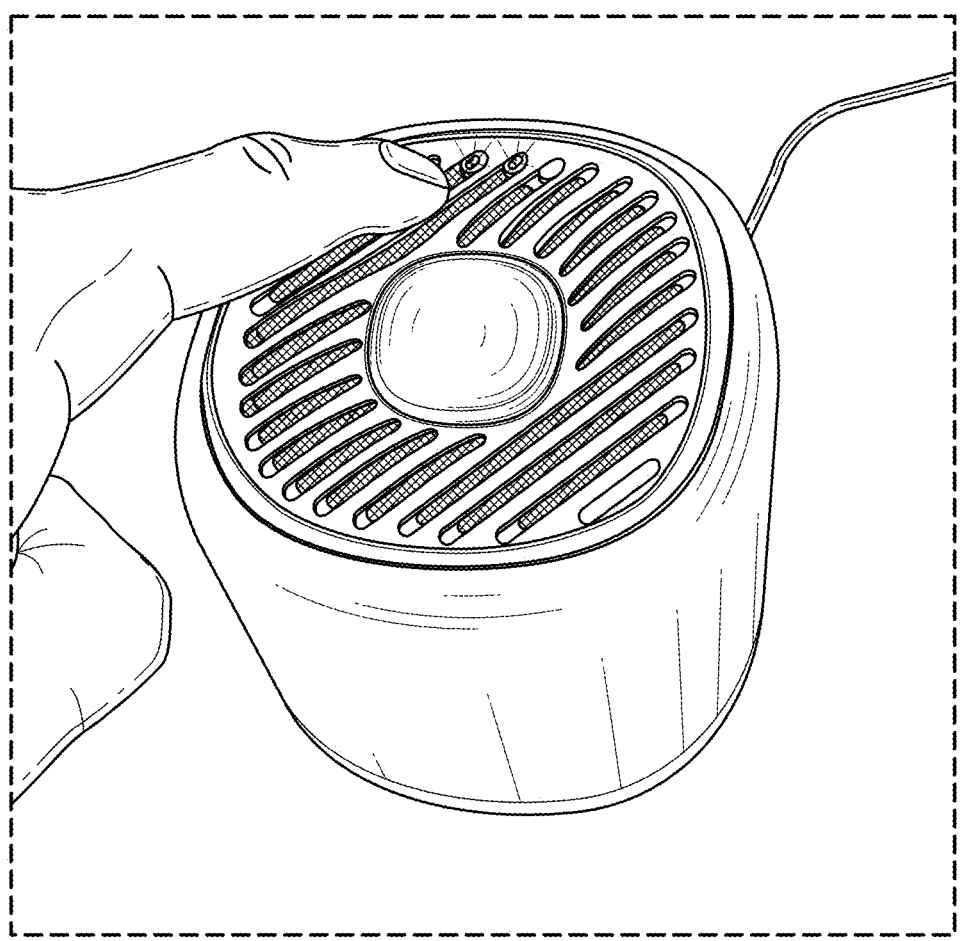

FIG. 12 illustrates an exploded view of a combined humidifier and aroma diffuser device in accordance with a second embodiment. FIG. 13 illustrates the manual addition of oil on a top surface of a diffuser puck or minor diffuser placed within an airflow outlet area of the combined humidifier and aroma diffuser device in accordance with the second embodiment.

FIGS. 14A-F are a first sequence of photographs showing operation of one embodiment.

FIGS. 15A-F are a second sequence of photographs showing operation of one embodiment.

In accordance with one embodiment, an aroma diffuser device can include: a fan operable to flow air; a body section housing the fan; a first diffuser for diffusing a first aromatic substance; a base configured to: removably receive and support the body section, and removably receive and support the first diffuser; an upper air passage structure disposed above at least a majority of the body section, the upper air passage structure defining a first plurality of openings configured to permit passage of air through the upper air passage structure; a lower air passage structure disposed below at least majority of the body section, the lower air passage structure defining a second plurality of openings configured to permit passage of air through the lower air passage structure; a puck-shaped second diffuser for diffusing a second aromatic substance; and a diffuser receptacle having a cupped shape for receiving and supporting the second diffuser in a horizontal position, the diffuser receptacle providing open air access to the second diffuser from above the device, the diffuser receptacle positioned among the first plurality of openings of the upper air passage structure so as to permit air passage about the second diffuser.

The first diffuser and the second diffuser can each be made of ceramic or diatomite stone. The fan can be configured to draw air into the lower air passage structure and flow the air around the first diffuser, through an interior of the body section, and out of the upper air passage structure around the second diffuser. The fan can be configured to draw air from around the second diffuser into the upper air passage structure and flow the air through an interior of the body section, around the second diffuser, and out of the lower air passage structure. The device can further include one or more user controls for turning the fan on and for varying a speed of the fan. The device can further include a plurality of magnets configured to removably secure the body section to the base. The device can further include a universal serial bus (USB) receptacle port for receiving power through a USB cable.

Although the subject matter has been described in terms of certain embodiments, other embodiments that may or may not provide various features and aspects set forth herein shall be understood to be contemplated by this disclosure. The specific embodiments set forth herein are disclosed as examples only, and the scope of the patented subject matter is defined by the claims that follow.

The invention claimed is:

1. An aroma diffuser device comprising:
   a fan operable to flow air;
   a body section housing the fan;
   a first diffuser for diffusing a first aromatic substance;
   a base configured to:
      removably receive and support the body section, and removably receive and support the first diffuser;
   an upper air passage structure disposed above at least a majority of the body section, the upper air passage structure defining a first plurality of openings configured to permit passage of air through the upper air passage structure;
   a lower air passage structure disposed below at least a majority of the body section, the lower air passage structure defining a second plurality of openings configured to permit passage of air through the lower air passage structure;
   a puck-shaped second diffuser for diffusing a second aromatic substance; and
   a diffuser receptacle having a cupped shape for receiving and supporting the second diffuser in a horizontal position, the diffuser receptacle providing open air access to the second diffuser from above the device, the diffuser receptacle positioned among the first plurality of openings of the upper air passage structure so as to permit air passage about the second diffuser,
   wherein the puck-shaped second diffuser is positioned vertically above the first diffuser such that air entering the aroma diffuser via the lower air passage interfaces with the first diffuser before the puck-shaped second diffuser.

2. The device of claim 1, wherein the first diffuser and the second diffuser are each made of ceramic or diatomite stone.

3. The device of claim 1, wherein the fan is configured to draw air into the lower air passage structure and flow the air around the first diffuser, through an interior of the body section, and out of the upper air passage structure around the second diffuser.

4. The device of claim 1, wherein the fan is configured to draw air from around the second diffuser into the upper air passage structure and flow the air through an interior of the body section, around the second diffuser, and out of the lower air passage structure.

5. The device of claim 1, further comprising one or more user controls for turning the fan on and for varying a speed of the fan.

6. The device of claim 1, further comprising a plurality of magnets configured to removably secure the body section to the base.

7. The device of claim 1, further comprising a universal serial bus (USB) receptacle port for receiving power through a USB cable.

* * * * *